Patented Apr. 1, 1924.

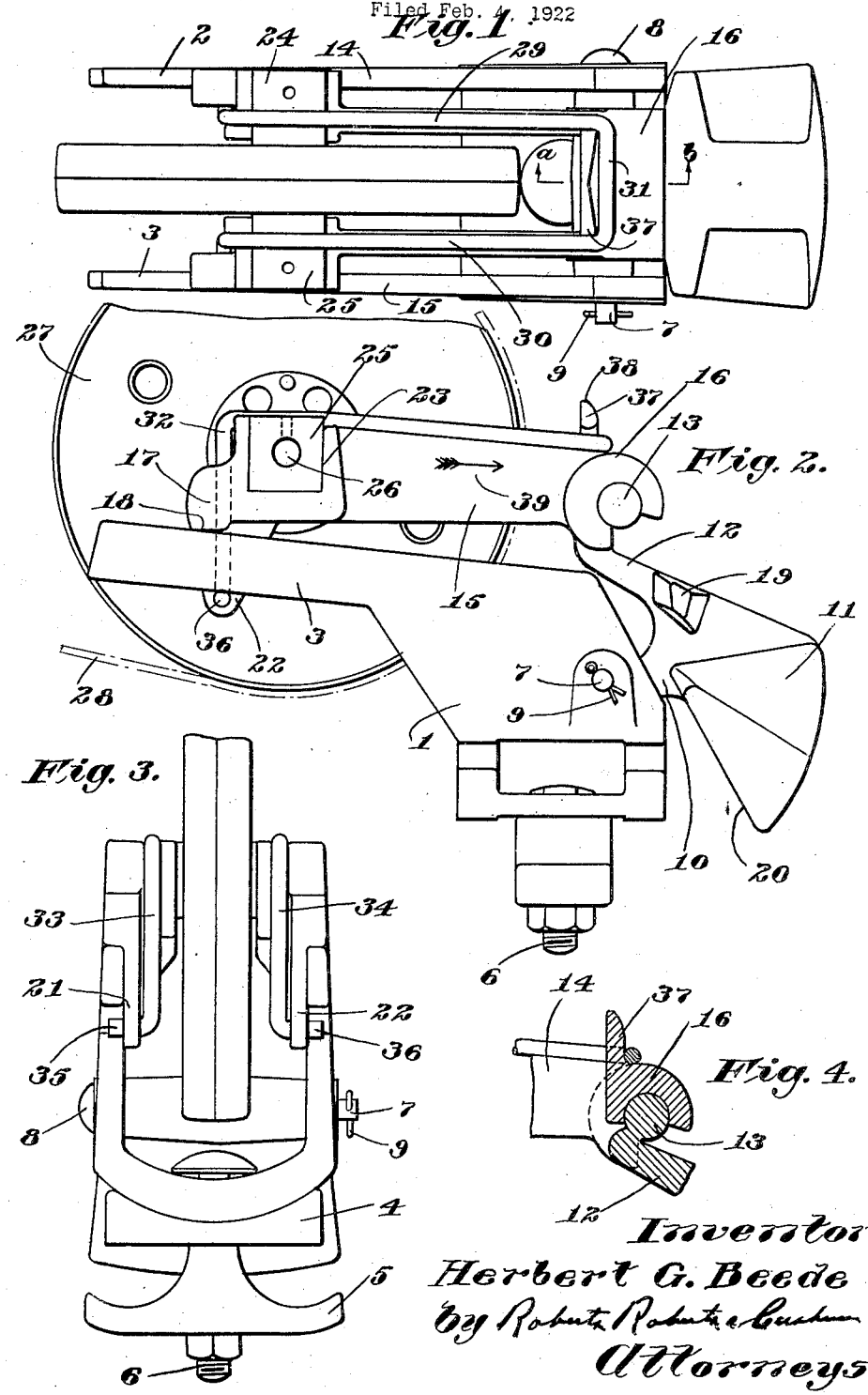

1,488,902

UNITED STATES PATENT OFFICE.

HERBERT G. BEEDE, OF PAWTUCKET, RHODE ISLAND.

TENSION PULLEY.

Application filed February 4, 1922. Serial No. 534,181.

*To all whom it may concern:*

Be it known that I, HERBERT G. BEEDE, citizen of the United States of America, and resident of Pawtucket, in the county of Providence and State of Rhode Island, have invented new and useful Improvements in Tension Pulleys, of which the following is a specification.

This invention concerns tension pulleys and relates more particularly to that type of tension pulley commonly employed on spinning or twisting frames for maintaining the driving belt for the spindle whirl under proper tension during operation.

In providing for the necessary movement of such pulleys for tensioning the belt, it has been common either to mount the pulley bearings upon a swinging lever arm or to arrange such bearings in a slidably guided carriage, the proper tensioning action being secured by the use of a spring or weight. When, however, the first of these arrangements is employed it is found in many cases that the device is too sensitive, responding to the vibrations of the machine and failing to maintain the desired uniformity of tension on the belt. On the other hand, when a sliding carriage is used, the guide rails or tracks upon which it slides soon become gummed up with oil and fly to an extent such that the frictional resistance is so increased as to render the pulley inoperative for the intended purpose.

The main object of the present invention is accordingly to provide a tension pulley for the purpose described having the advantages inherent in pulleys of both the pivotally and slidably mounted type, but without the defects of either.

A further object is to provide simple and improved means for releasably securing the pulley bearing blocks in operative position whereby they may readily be replaced when worn.

In the accompanying drawings there is illustrated, by way of example, one arrangement of parts suitable for carrying the above objects into effect, and in such drawings:

Figure 1 is a plan view of a tension pulley device constructed in accordance with the present invention.

Figure 2 is a fragmentary side elevation of the device shown in Fig. 1.

Figure 3 is a fragmentary end elevation from the inner or left-hand end of Fig. 1, and Figure 4 is a fragmentary sectional detail taken on a line such as *a—b* of Fig. 1.

The device comprises in general a U-shaped frame 1 having the spaced arms 2—3. The upper surfaces of these arms lie substantially in the same plane, the arms constituting guide rails for a movable carriage hereinafter to be described. Such upper surfaces may be somewhat inclined downwardly from their free extremities, if desired, and as illustrated in Fig. 2, thus facilitating the tensioning movement of the carriage. Suitable clamping means, comprising the members 4, 5 and the bolt 6 are provided for securing the frame in proper position upon the machine frame or other suitable support.

At the outer or closed end of the frame, aligned openings are provided for the reception of a shaft or pin 7, such shaft being retained in position by an integral head 8 and a cotter 9, or in any other suitable manner. Pivotally supported upon this shaft is a three-armed lever, the arm 10 thereof having a suitable journal opening for the reception of the shaft. The lower arm 11 is weighted in such manner that the lever tends to turn in a clockwise direction as viewed in Fig. 2. The upper arm 12 of this lever extends to a point above the plane of the rails 2, 3 and is provided at its extremity with a transverse member 13 of circular cross section forming a pintle whereby the lever may be pivotally connected to the movable carriage. While as herein shown the member 13 is integral with the lever arm 12 it is evident that such member might be formed as a separate pin if desired, suitably secured in a proper opening in the end of the arm 12.

The movable carriage device upon which the pulley is mounted is generally of U-shape and comprises the substantially parallel arms 14, 15, such arms being connected at the outer end of the device by the transverse member 16. The member 16 is provided with a journal opening in which is received the pintle 13 whereby the lever arm 12 and the outer end of the carriage are pivotally connected together, the lever thus acting as a support for one end of the carriage.

Adjacent to the extremity of each of the arms 14, 15, a lug such as 17 is provided, such lugs having lower surfaces 18 engageable with the upper surfaces of the respective rail members 2, 3 of the supporting frame. The surfaces 18 are slidable along the upper surfaces of the rails, and as the surfaces 18 are substantially flat, and as the outer end of the carriage is constrained to move in a circular arc by its connection to the end of lever arm 12, it is evident that at any given time there is substantially a line contact between the lugs 17 and respective rails.

The movement of the carriage longitudinally of the rails is limited in one direction by a laterally projecting lug 19 carried by the lever arm 12, and in the opposite direction by engagement of the surface 20 of the weighted arm 11 with the outer face of the frame. Lateral displacement of the carriage relatively to the rails is prevented by means of lugs 21, 22 which project downwardly from the ends of the respective arms 14, 15 of the carriage and which engage the inner surfaces of the rails 2, 3 respectively.

Each of the arms 14, 15 of the carriage is provided at a point near its extremity with an upwardly open socket such as indicated at 23, and in each of these sockets is seated a journal block, 24, 25 respectively. These journal blocks may be of wood, fibre, or other suitable material and are provided with journal openings for the reception of the shaft 26 upon which is secured the pulley 27. At 28 there is indicated in dotted lines a belt engaging such pulley and which is tensioned thereby.

In order to maintain the bearing blocks 24, 25 in proper position within the sockets provided therefor, a substantially V-shaped wire loop or bail is employed, this loop or bail comprising the substantially parallel side members 29, 30 connected by the transverse member 31. The members 29 and 30 are angularly bent as indicated at 32 and extend downwardly as indicated at 33, 34 to points adjacent the lower ends of the respective lugs 21, 22. The lugs 21, 22 are provided with openings for the reception of the lower ends 35, 36 of the depending members 33, 34, such lower ends being bent outwardly and at right angles to pass through the openings in the lugs 21 and 22. The extremities 35, 36 of the wire bail project beyond the sides of the lugs 21, 22 and underlie the lower edges of the respective rails 2, 3, the parts 35, 36 thus serving to prevent lifting of the inner edge of the carriage away from the rails. Parts 35 and 36 serve to pivotally connect the bail to the carriage.

In the normal position of this device, the members 29, 30 overlie the respective bearing blocks 24, 25 such blocks, if desired, being provided with grooves in their upper surfaces in which the members 29, 30 may be seated. A lug 37 projects upwardly from the member 16 of the carriage and such lug in the normal position of the parts passes upwardly between the arms 29, 30 of the wire bail and frictionally engages the member 31 of such bail. The surface 38 of the lug 37 may be beveled or inclined as indicated in Fig. 2 to permit ready engagement of the bail with such lug.

When these parts occupy the position shown in Fig. 2 the frictional engagement between the lug 37 and the bail serves to retain the latter securely in position, such bail in turn holding the bearing blocks within their sockets. If the latter blocks become worn they may readily be removed by swinging the bail upwardly on its pivot members 35, 36, thus releasing the bearing blocks for removal. Upon substitution of the new blocks the bail is swung down into frictional engagement with the lug 37 thus retaining the new blocks in operative position.

In the operation of the tension pulley device the belt 38 passing about the pulley is held under tension by the action of the weighted arm 11 of the lever device which tends constantly to move the carriage in the direction indicated by the arrow 39 in Fig. 2.

It will be noted that the outer end of the carriage is supported by the lever device to swing in a circular arc, the movement of this end of the lever being unaffected by the condition of the supporting rails, while the pivotal connection between the carriage and the lever as well as the mounting of the latter in the frame is such as to exert little frictional resistance to movement of the carriage. On the other hand the opposite end of the carriage moves in frictional engagement with the rails so that a certain resistance of movement of the carriage is secured which is sufficient to prevent undue oscillations thereof under the vibrational movement of the machine. At the same time, the engagement of the surfaces 18 with the rails is such that there is a tendency to scrape and clean the upper surfaces of the rails as the carriage moves therealong.

The device as thus provided is simple in construction and is found extremely efficient in operation, and to be superior to devices of the same general type as previously constructed. While a specific embodiment of the device has herein been illustrated and described, it is to be understood that the invention, in so far as its general aspects are concerned, might well be embodied in other arrangements of parts, and that variations and modifications in the shape, construction, and material of the parts employed may well be made without departing from the spirit of the invention.

What I claim and desire to secure by Letters Patent of the United States is:

1. A tension pulley device comprising a pulley carriage, means for guiding one end of said carriage in a substantially rectilinear path, and means for guiding the opposite end thereof in an arcuate path.

2. A tension pulley device comprising a pulley carriage, pivotally mounted means for supporting one end of said carriage, means tending to impart bodily movement to said carriage, and frictional means for retarding such movement.

3. A tension pulley device comprising a pulley carriage, a guide rail for sliding engagement by one end of said carriage, and movable means for supporting the opposite end of said carriage out of engagement with said rail.

4. A tension pulley device comprising inclined guide means, a pulley carriage bearing at one end upon said guide means, and a lever arm having its free extremity constructed and arranged to support the opposite end of said carriage.

5. A tension pulley device comprising a supporting frame, parallel guide rails carried by said frame, a lever arm pivotally mounted upon said frame and extending to a point above the plane of said rails, a pulley carriage having sliding engagement with said rails, pivotal means for securing the upper end of said lever to the carriage, and means tending to swing said lever whereby to move said carriage toward the inner ends of said rails.

6. A tension pulley device comprising guide rails, a lever mounted to swing about a fixed axis adjacent to one end of said rails, a pulley carriage having elements adjacent to one of its ends for sliding engagement with the respective rails, means engageable with the inner surfaces of the respective rails whereby to retain the carriage in proper position relatively to the rails, and pivotal means connecting the opposite end of the carriage with the free extremity of the lever.

7. A device of the class described comprising a frame having a pair of parallel guide rails, a lever arm pivoted adjacent to one end of said rails and having a pivot pin at its free extremity, a pulley carriage having a journal opening for the reception of said pivot pin, a pulley journalled upon the carriage, said carriage having elements engaging the guide rails, and means tending to swing said lever whereby to move said carriage toward the inner ends of said rails.

8. In combination with a tension pulley device having guide rails and a pulley carriage slidably engaging the same, means for holding the carriage upon the rails comprising a U-shaped wire loop having angularly and oppositely directed end portions, said portions being journalled in openings in the carriage and projecting therefrom to underlie the respective rails.

9. A tension pulley device comprising a frame provided with guide rails, a pulley carriage having elements slidably engaging said rails, said carriage having open sockets for the reception of journal blocks, means for retaining such blocks in the sockets and for retaining the carriage upon the rails comprising a U-shaped wire loop having its extremities journalled in openings in the carriage and underlying the rails, and having its intermediate portions arranged normally to extend across the respective sockets, and a lug projecting from the carriage for frictional-holding engagement with the closed end of said loop.

Signed by me at Pawtucket, Rhode Island, this thirty first day of January 1922.

HERBERT G. BEEDE.